United States Patent
Kaminou et al.

(10) Patent No.: US 12,495,780 B2
(45) Date of Patent: Dec. 16, 2025

(54) GUIDE FOR FISHING ROD

(71) Applicant: Shimano Inc., Osaka (JP)

(72) Inventors: Yoshiyuki Kaminou, Osaka (JP); Kazuma Taniguchi, Osaka (JP)

(73) Assignee: Shimano Inc., Osaka (JP)

( * ) Notice: Subject to any disclaimer, the term of this patent is extended or adjusted under 35 U.S.C. 154(b) by 177 days.

(21) Appl. No.: 17/719,875

(22) Filed: Apr. 13, 2022

(65) Prior Publication Data

US 2022/0394964 A1 Dec. 15, 2022

(30) Foreign Application Priority Data

Jun. 9, 2021 (JP) .................. 2021-096665

(51) Int. Cl.
*A01K 87/04* (2006.01)

(52) U.S. Cl.
CPC .................. *A01K 87/04* (2013.01)

(58) Field of Classification Search
CPC ...................................... A01K 87/04
USPC ............................................. 43/24
See application file for complete search history.

(56) References Cited

U.S. PATENT DOCUMENTS

| | | | | |
|---|---|---|---|---|
| 4,682,439 A * | 7/1987 | Inoue | ............ | A01K 87/04 43/24 |
| 6,067,743 A * | 5/2000 | Ohmura | ............ | A01K 87/04 D22/143 |
| 11,076,585 B2 * | 8/2021 | Akiba | ............ | A01K 87/04 |
| 2009/0165355 A1 * | 7/2009 | Jeong | ............ | A01K 87/04 242/157 R |
| 2011/0010922 A1 * | 1/2011 | Jeong | ............ | A01K 87/04 29/530 |
| 2016/0286772 A1 * | 10/2016 | Gnann | ............ | A01K 87/04 |
| 2019/0008129 A1 * | 1/2019 | Akiba | ............ | A01K 87/04 |
| 2019/0029240 A1 * | 1/2019 | Akiba | ............ | A01K 87/04 |
| 2020/0329687 A1 * | 10/2020 | Kaminou | ............ | A01K 87/04 |
| 2022/0394965 A1 * | 12/2022 | Kaminou | ............ | A01K 87/04 |

FOREIGN PATENT DOCUMENTS

| JP | 2015146766 A | * | 8/2015 | |
|---|---|---|---|---|
| JP | 2016149993 A | * | 8/2016 | |
| JP | 2017000067 A | * | 1/2017 | ............ A01K 87/04 |
| JP | 2017046640 A | * | 3/2017 | ............ A01K 87/04 |
| JP | 6553455 B2 | * | 7/2019 | ............ A01K 87/04 |

(Continued)

*Primary Examiner* — Darren W Ark
(74) *Attorney, Agent, or Firm* — Global IP Counselors, LLP (57) ABSTRACT

A guide for a fishing rod includes a rod body, a guide ring configured to have a fishing line inserted therethrough, and a guide frame fixed to the rod body, extending outward in a radial direction of the rod, and holding the guide ring. The guide ring has an outer circumferential groove along an outer circumferential edge positioned on an outer side of a central axis of the guide ring in the radial direction of the rod. The guide frame further has a frame including a ring-shaped wire material holding the guide ring, a supporting leg portion fixed to the rod body and connecting to and supporting the frame, and a first opposing surface of the outer circumferential groove opposing at least a portion of the frame, and a second opposing surface of the frame opposing the first opposing surface, the first and second opposing surfaces having different shapes.

5 Claims, 6 Drawing Sheets

(56) References Cited

FOREIGN PATENT DOCUMENTS

| JP | 2019110812 A | * | 7/2019 | |
|----|---|---|---|---|
| JP | 2020022384 A | * | 2/2020 | |
| JP | 2020156399 A | * | 10/2020 | |
| KR | 20140032742 A | * | 3/2014 | |
| WO | WO-2012060122 A1 | * | 5/2012 | ............. A01K 87/04 |
| WO | WO-2016160879 A1 | * | 10/2016 | ............. A01K 87/04 |
| WO | WO-2017130470 A1 | * | 8/2017 | ............. A01K 87/04 |
| WO | WO-2017149832 A1 | * | 9/2017 | ............. A01K 87/02 |

* cited by examiner

GUIDE FOR FISHING ROD

CROSS-REFERENCE TO RELATED APPLICATIONS

This application claims priority to Japanese Patent Application No. 2021-096665, filed on Jun. 9, 2021. The entire disclosure of Japanese Patent Application No. 2021-096665 is hereby incorporated herein by reference.

BACKGROUND

Field of the Invention

The present invention relates to a guide for a fishing rod.

Background Art

Conventional guides for fishing rods are known in the prior art which comprise a guide ring through which a fishing line is inserted, and a guide frame that holds the guide ring and that is fixed to the body of the rod and extends outwardly in the radial direction of the rod, wherein the guide frame has a frame part composed of ring-shaped wire material that holds the guide ring (for example, refer to Japanese Laid-Open Patent Application No. 2015-146766 and Japanese Patent No. 6553455).

Japanese Laid-Open Patent Application No. 2015-146766 discloses a configuration in which the outer circumferential surface of a guide ring is a flat surface, and a D-cut shaped flat portion is formed in the corresponding portion of the inner circumferential surface of the frame.

Further, Japanese Patent No. 6553455 discloses a configuration in which a curved peripheral groove is formed in the outer circumferential surface of a guide ring, and includes a frame formed from a metal wire material with a circular cross section that holds the guide ring.

SUMMARY

It has been determined however that in the above-mentioned guide for a fishing rod shown in Japanese Laid-Open Patent Application No. 2015-146766, although it is possible to improve the attachment force to a certain extent by increasing the contact area between the D-cut shaped flat surface of the frame and the outer circumferential surface of the guide ring, the contact area cannot be increased beyond the area of the flat surface.

Further, in this conventional fishing rod, it is difficult to position the flat surface of the frame and the outer circumferential surface of the guide ring. Specifically, positioning in the central axis direction of the guide ring is difficult, and, there is the risk that the attachment force will decrease as a result of cracking of the bonded portion due to axial displacement.

In Japanese Patent No. 6553455, it has been determined that it is possible to increase the contact area between the curved outer circumferential surface of the frame and the curved surface of the outer circumferential groove, compared to a flat surface, such as that in Japanese Laid-Open Patent Application No. 2015-146766, and although positioning can be easily carried out, there is the risk that sufficient space for disposing an adhesive, or the like, will not be available, so that it is not possible to obtain the desired attachment force.

Further, in a conventional guide for a fishing rod, the outer shape of the frame made from metal wire material with a circular cross section is formed along the curved peripheral groove of the guide ring, so that the frame tends to be thicker than necessary, which is one factor that prevents weight reduction.

Embodiments of the present invention were conceived in light of these circumstances, and one object thereof is to provide a guide for a fishing rod that facilitates positioning between the frame and the guide ring, which prevents a reduction in the fixing force of both, and which can realize a reduction in weight.

A guide for a fishing rod according to an embodiment of the present invention comprises a guide ring, through which a fishing line is inserted, and a guide frame, which is fixed to the rod body extending outwardly in the radial direction of the rod and which holds the guide ring, wherein the guide ring has an outer circumferential groove along the outer peripheral edges located outside of the central axis of the guide ring in the radial direction of the rod; the guide frame has a frame composed of a ring-shaped wire material that holds the guide ring and a support leg portion that is fixed to the rod body and that connects to and supports the frame; and a first opposing surface of the outer circumferential groove that opposes at least a portion of the frame, and a second opposing surface of the frame that opposes the first opposing surface, have different shapes from each other.

By the guide for a fishing rod according to this embodiment of the present invention, because the first opposing surface of the outer circumferential groove guide ring that opposes at least a portion of the frame and the second opposing surface of the frame that opposes the first opposing surface have different shapes from each other, it is possible to increase the opposing surface areas of the first opposing surface and the second opposing surface. It is thereby possible to have a large contact area between the guide ring and the frame, to thereby improve the fixing force of both.

Further, by the guide for a fishing rod according to this embodiment of the present invention, since the first opposing surface of the guide ring and the second opposing surface of the frame need only to be arranged so as to face each other, it is relatively easy to position the frame and the guide ring.

Moreover, in the case of this embodiment of the present invention, since it is not necessary to match the cross-sectional shape of the frame with the shape of the outer circumferential groove of the guide ring, it is possible to reduce the thickness and the cross-sectional shape of the frame, thereby reducing the weight.

Further, according to this embodiment of the present invention, the second opposing surface of the frame is fixed in a state of being housed in the outer circumferential groove of the guide ring, so that it is possible to minimize the overhanging part of the second opposing surface that protrudes from the outer circumferential groove. As a result, it is possible to prevent breakage of the frame at the part that protrudes from the outer circumferential groove, which could potentially tangle the fishing line in the overhanging portion, and cause the pooling of salt water due to adhesion of seawater, as has been found in the prior art.

The first opposing surface preferably has a concave portion that is recessed toward the center of the guide ring, and the second opposing surface preferably has a planar shaped portion along the central axis direction of the guide ring.

In this embodiment, it is possible to secure a large space (area) between the guide ring and the frame, which makes it possible to fill the space (area) with, for example, an adhesive, to thereby increase the adhesive force between the second opposing surface and the outer circumferential groove and to enhance the attachment force of both.

The first opposing surface can have a planar shape along the central axis direction of the guide ring, and the second opposing surface can have a concave portion that is recessed in a direction opposite to the center of the guide ring.

In this embodiment, it is possible to secure a large space (area) between the guide ring and the frame, which makes it possible to fill the space (area) with, for example, an adhesive, to thereby increase the adhesive force between the second opposing surface and the outer circumferential groove and to enhance the attachment force of both.

A space can be disposed between the first opposing surface and the second opposing surface, and the space can be filled with an adhesive.

By such a configuration, it is possible to secure a sufficient space (filling area) between the outer circumferential groove and the second opposing surface having a rectangular cross section. By filling this area with an adhesive, the fixing force between the second opposing surface and the outer circumferential groove can be further enhanced.

Moreover, by filling the gap between the frame and the guide ring with an adhesive, it is possible to eliminate a gap (step) formed between the frame and the guide ring, so that seawater does not remain in the stepped portion as has been found in the prior art, making it possible to suppress or eliminate pooling of saltwater.

The first opposing surface and/or the second opposing surface can be disposed on at least a portion of a semi-circumferential portion on a side away from the rod body.

In this embodiment, since the connection area between the frame and the guide ring can be a non-continuous or partial connection in the circumferential direction, the cross-sectional area of the member can be reduced compared to a connection over the entire circumference, thereby achieving a reduction in weight.

The second opposing surface can be a portion of the wire material of the frame that is formed into a planar shape.

In this embodiment, the contact area with the first opposing surface can be increased by forming the second opposing surface shaping a portion of the wire material of the frame into a plane (i.e., having planar shape).

The second opposing surface can be a portion of the wire material of the frame that has a rectangular cross section.

In this embodiment, since the frame has a rectangular cross-sectional shape, it is possible to increase the surface area of the portion housed in the outer circumferential groove of the guide ring and to obtain a large contact area between the frame and the outer circumferential groove. As a result, for example, it is possible to have a large filling area where adhesive can be filled between the outer circumferential groove and the frame with a rectangular cross-sectional shape, to thereby increase the adhesive force between the frame and the outer circumferential groove and to enhance the fixing force of both.

Further, in one embodiment of the present invention, the width of the rectangular portion can be configured to correspond to the groove width, so that the thickness of the wire material of the frame can be made thinner than in the prior art, and an overall weight reduction of the guide for a fishing rod is possible.

The frame can include the wire material and a sleeve disposed on a portion of the wire material, and the second opposing surface can be disposed in the sleeve.

In this embodiment, a rectangular sleeve, which is a different member than the wire material of the frame, can be disposed to cover the wire material, and the rectangular sleeve is housed and fixed in the outer circumferential groove of the guide ring. In this embodiment, because the rectangular sleeve has, for example, a rectangular cross-sectional shape, it is possible to increase the surface area of the portion of the sleeve housed in the outer circumferential groove, and to obtain a large contact area between the sleeve and the outer circumferential groove. As a result, it is possible to obtain a large filling area where adhesive can be filled between the outer circumferential groove and the sleeve, to thereby increase the adhesive force between the sleeve and the outer circumferential groove and to enhance the attachment force of both.

Further, by making the sleeve and the wire material separate members, a thin wire material can be applied.

Further, in an embodiment of the present invention, a material different from that of the wire material can be employed for the sleeve, so that by using, for example, a material with good adhesiveness, the fixing force with the guide ring can be enhanced.

At least a portion of the sleeve can have a rectangular cross section.

In this embodiment, because the wire material itself constituting the frame has a rectangular cross section, it is not necessary to form the second opposing surface using a separate member. As a result, the frame can be easily processed, thereby suppressing or avoiding an increase in the cost of the member.

The sleeve can have a housing portion for housing the wire material of the frame.

In this embodiment, the contact area between the sleeve and the wire material housed in the housing portion can be increased.

By the guide for a fishing rod according to embodiments of the present invention, positioning between the frame and the guide ring is a simple matter, reduction in the fixing force of both can be prevented, and weight reduction can be achieved.

DETAILED DESCRIPTION OF EMBODIMENTS

An embodiment of the guide for a fishing rod according to the present invention will be explained below with reference to the drawings. In each of the drawings, there are cases in which the scale of each component member has been appropriately changed as required to improve visualization of the component member.

Figure 1:
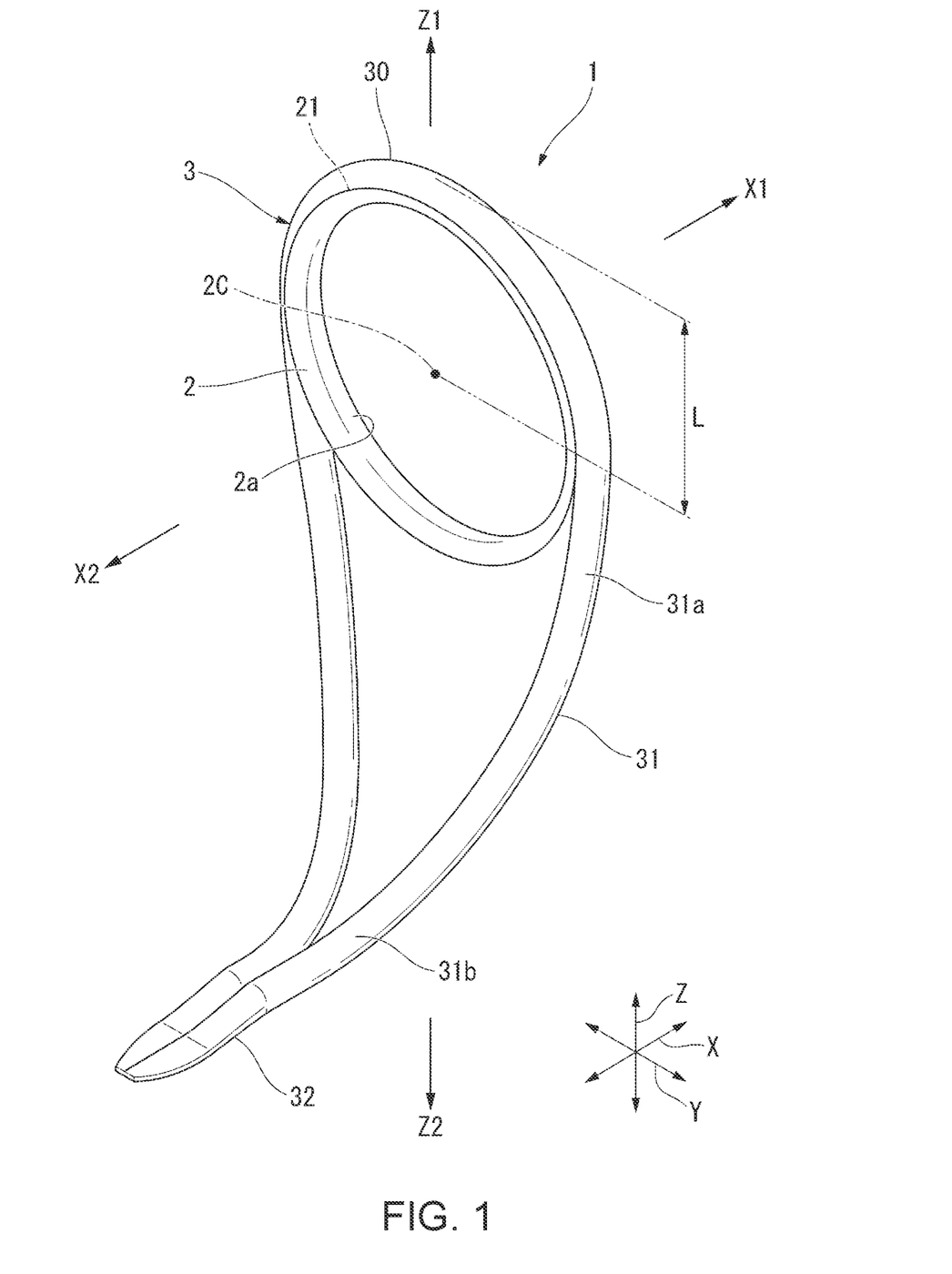
FIG. 1 is a front view of a guide for a fishing rod according to an embodiment of the present invention.
Figure 2:
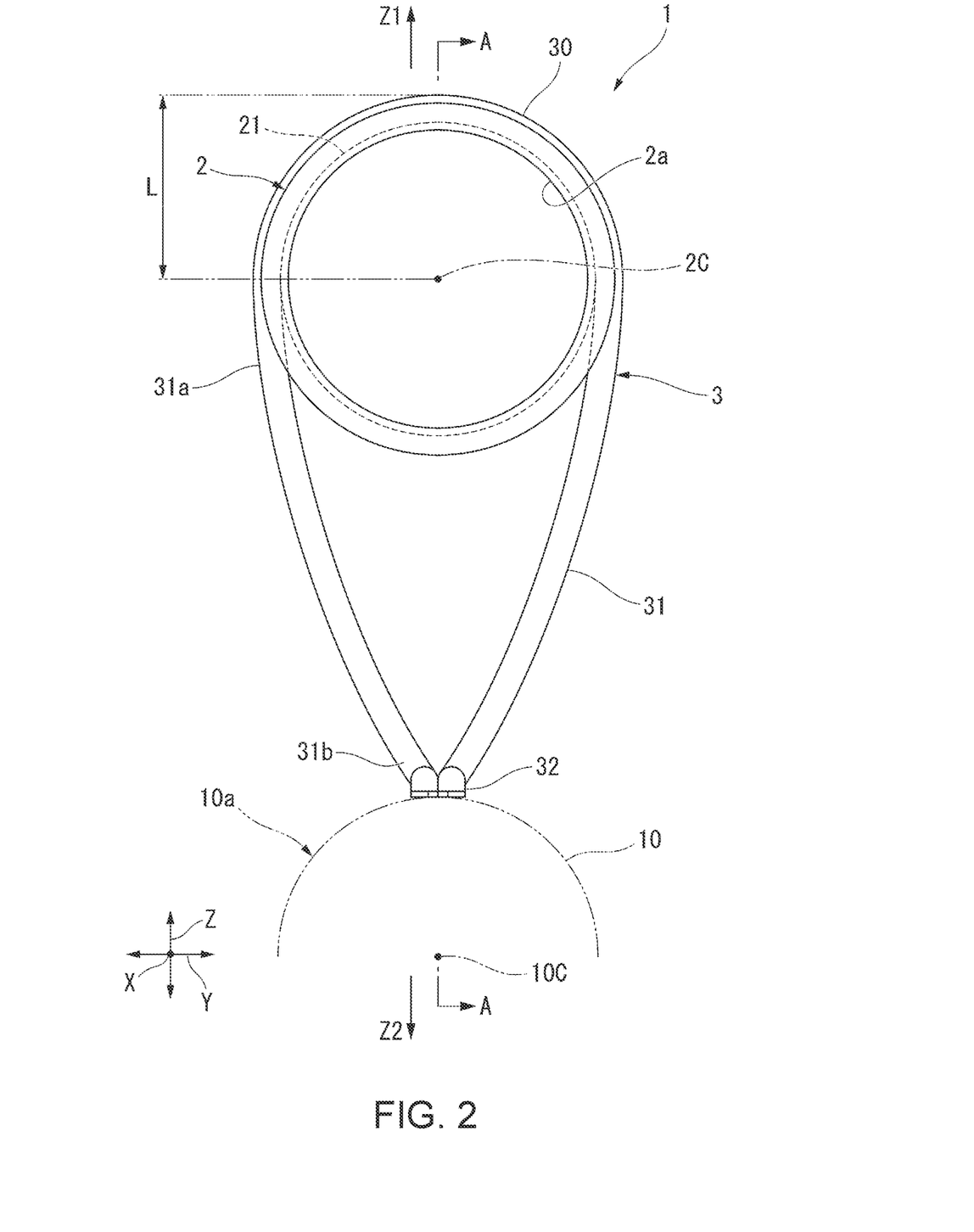
FIG. 2 is a front view of the guide for a fishing rod as viewed from a direction of the central axis of a guide ring.
Figure 3:
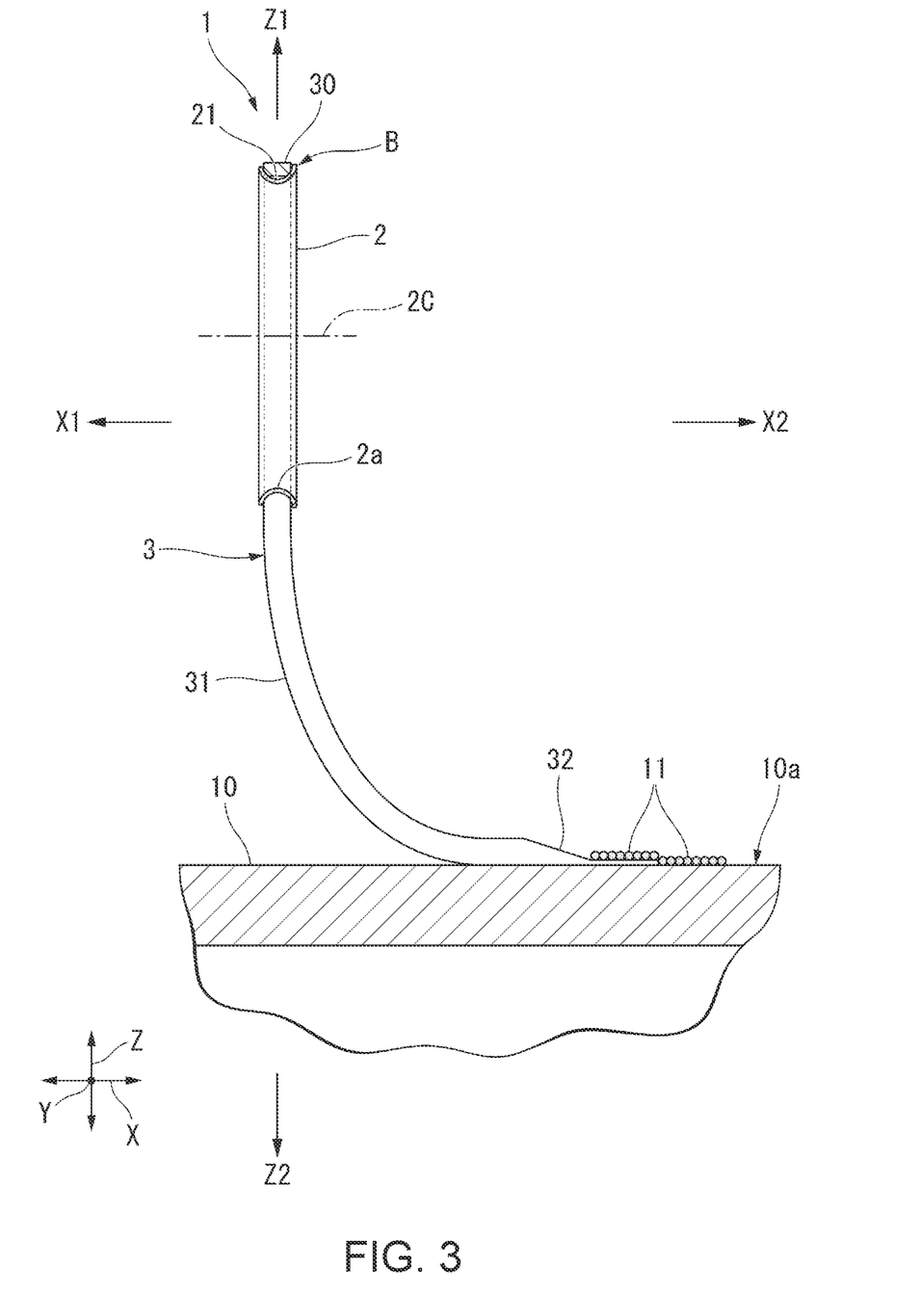
FIG. 3 is a cross-sectional view along line A-A shown in FIG. 2 of the guide for a fishing rod as viewed from the left-right direction.

As shown in FIGS. 1 to 3, a guide for a fishing rod 1 according to the present embodiment is a guide member that is fixed to an outer circumferential surface 10a of the rod body 10 of a fishing rod, and holds a guide ring 2 through which a fishing line is inserted. A plurality of the guides for a fishing rod 1 are arranged on the outer circumferential surface 10a of the rod body 10 at prescribed intervals in the axial direction of the rod.

The guide for a fishing rod 1 has the guide ring 2 through which a fishing line is inserted and guides the fishing line, and a guide frame 3 that is fixed to the rod body 10, that extends outwardly in the radial direction of the rod, and that holds the guide ring 2.

Here, in the guide for a fishing rod 1 shown in the drawings, the axial direction of the rod body 10 is referred to as the front-rear direction X, the rod tip side (front side) is indicated by reference symbol X1, and the rod tail side (rear side) is indicated by the reference symbol X2. Further, a direction orthogonal to the axial direction of the rod body 10 on a plane that passes through central axis 2C of the guide ring 2 is defined as the vertical direction Z, a direction away from the rod body 10 is defined as the upper side, indicated by the reference symbol Z1, and the direction approaching the rod body 10 is defined as the lower side, indicated by reference symbol Z2. The upper side Z1 can be referred to as the distal end side, and the lower side Z2 can be referred to as the proximal end side. Further, the direction orthogonal to the axial direction of the rod body 10 in a plan view as seen from the upper side Z1 is defined as the left-right direction Y. The axial direction (front-rear direction X) of the rod body 10 is the direction of central axis 10C of the rod body 10, the longitudinal direction of a mounting leg portion 32 of the guide frame 3, described further below, and the left-right direction Y is the lateral direction (width direction) of the mounting leg portion 32. Further, in the following description, the direction around central axis 2C when the guide ring 2 is viewed from central axis 2C direction is defined as the circumferential direction, and a direction orthogonal to central axis 2C is defined as the radial direction.

Guide Ring

The guide ring 2 has an outer circumferential groove 21 along an outer peripheral edge positioned on the outer side of central axis 2C of the guide ring 2 in the radial direction of the rod, and is held coaxially with a frame 30 of the guide frame 3, described further below. That is, the fishing line slides on an inner circumferential surface 2a of the guide ring 2, which thereby directly guides the fishing line.

The guide ring 2 is annularly shaped material, such as titanium, aluminum, SUS, or ceramic, having a low sliding resistance for the fishing line on the guide surface on the inner circumferential side of the ring. In the present embodiment, the guide ring 2 has a circular annular shape, for example, but can have an elliptical shape, an oval shape, or the like. The guide ring 2 is formed, for example, by pressing a metal plate into a prescribed shape.

Figure 4:
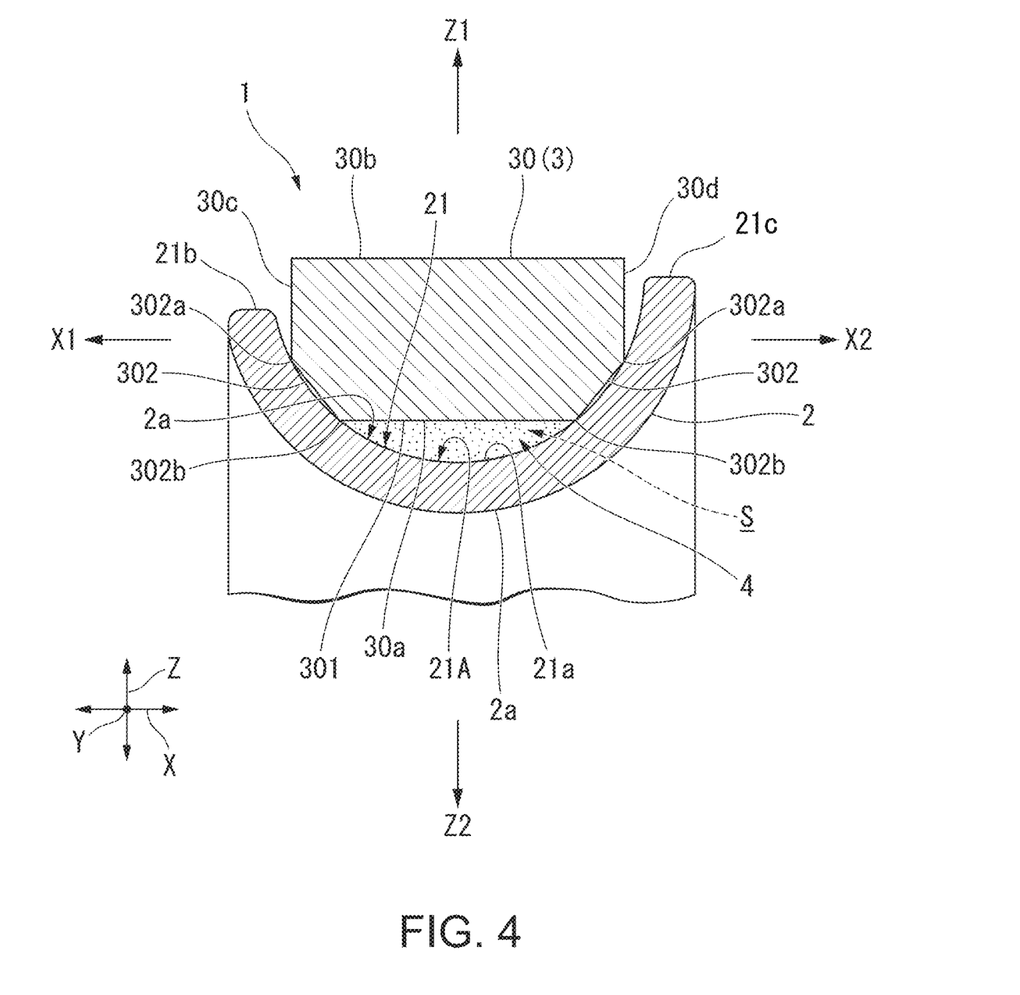
FIG. 4 is an enlarged view of portion B shown in FIG. 3, and a cross-sectional view showing a fixed state of a frame and the guide ring.

As shown in FIG. 4, the inner circumferential surface 2a of the guide ring 2 has a curved surface that is curved in the front-rear direction X so as to have a convex shape on the inner side (central axis 2C side shown in FIG. 2) as seen in cross section. The outer circumferential groove 21 of the guide ring 2 has a curved concave surface 21A (first opposing surface) that opposes at least a portion of the frame 30 (described further below). The curved concave surface 21A has a concave portion that is recessed toward the center direction (central axis 2C side) of the guide ring 2.

In a cross-sectional view along the vertical direction Z, the guide ring 2 has the convex inner circumferential surface 2a that is curved in an arc shape such that the central axis 2C side is convex, and a concave outer circumferential surface (outer circumferential groove 21) that is curved in an arc shape such that the central axis 2C side is convex.

Specifically, the outer circumferential groove 21 of the guide ring 2 has flange portions 21b, 21c, in which both sides of a bottom portion 21a of the central portion in the front-rear direction X respectively protrude radially outward as seen in cross section. As a result, the concave outer circumferential groove 21 is formed over the entire circumference of the outer circumferential surface of the guide ring 2 between the two flange portions 21b, 21c.

The frame 30 of the guide frame 3 is engaged with the outer circumferential groove 21 of the guide ring 2 between the two flange portions 21b, 21c, within an angular range of about 180 degrees from the central axis 2C to the upper side Z1 of the entire circumference of the circular cross section of the guide ring 2.

Guide Frame

As shown in FIGS. 1 to 3, the guide frame 3 includes the frame 30 composed of a ring-shaped wire material that holds the guide ring 2, a supporting leg portion 31 that is fixed to the rod body 10 and is connected to and supports the frame 30, and the mounting leg portion 32 that is connected to the supporting leg portion 31 and that is fixed to the outer circumferential surface 10a of the rod body 10.

The guide frame 3 is fixed to the outer circumferential surface 10a of the rod body 10 in a state in which the frame 30 is oriented toward the rod tip side (front side X1) with respect to the mounting leg portion 32. Here, the mounting leg portion 32 extends in the front-rear direction X.

The guide frame 3 curves from the front-end portion of the mounting leg portion 32 toward the upper side Z1, and then extends linearly to the upper side Z1. The portion of the guide frame 3 that curves toward the upper side Z1 is the supporting leg portion 31. In the present embodiment, the supporting leg portion 31 rises orthogonally with respect to the mounting leg portion 32, and central axis 2C of the guide ring 2 is parallel to central axis 10C of the rod body 10, but the supporting leg portion 31 can rise upwardly at an inclination such that central axis 2C of the guide ring 2 is not parallel to central axis 10C of the rod body 10. For example, the supporting leg portion 31 can be configured to rise upwardly with a forward-leaning attitude.

The supporting leg portion 31 is positioned between the frame 30 and the mounting leg portion 32 and connects the frame 30 and the mounting leg portion 32. As shown in FIG. 1, the supporting leg portion 31 has a two-legged configuration, in which two legs are arranged next to each other on the left and right. The left and right pair of the support leg portions 31 are bilaterally symmetric. The left and right pair of the supporting leg portions 31 respectively extend downward from both end portions of the frame 30 in the circumferential direction, forming an overall V shape when seen from the front or rear.

The left and right pair of the support leg portions 31 extend linearly along a tangent line, with both end portions of the frame 30 in the circumferential direction as tangent points, and also extend inwardly in the left-right direction Y so as to gradually approach each other, i.e., such that the interval between the two portions narrows as they approach the mounting leg portion 32, and contact each other at the lower end portion.

An upper end portion 31a of the supporting leg portion 31 is located on a plane that is orthogonal to the central axis of the frame 30 (central axis 2C of the guide ring 2).

The mounting leg portion 32 extends in a straight line in a plan view from the lower end portion of the supporting leg portion 31 toward a rear side X2 (rod tail side). In the present embodiment, the mounting leg portion 32 has a two-legged configuration, composed of prescribed length regions at both end portions of one metal wire material. That is, the mounting leg portion 32 is configured such that a left and right pair of linear bodies, formed of the prescribed length regions at both ends of one metal wire material, are aligned in parallel to the left and right, and each linear body extends rearwardly from a lower end portion 31*b* of the supporting leg portion 31. The left and right pair of linear bodies are joined to each other and integrated. While any joining method can be employed, welding is preferable.

The mounting leg portion 32 is wound around the outer circumferential surface 10*a* of the rod body 10 by a winding thread 11, as shown in FIG. 3.

The frame 30 is supported by the supporting leg portion 31 at a position away from the outer circumferential surface 10*a* of the rod body 10, and holds the guide ring 2, which guides a fishing line, on the inner circumferential surface thereof. The frame 30 is made of a metal wire material that is bent into a U shape, and the two end portions thereof in the circumferential direction are respectively connected to the upper end portions 31*a* of the pair of supporting leg portions 31. The frame 30 engages the outer circumferential groove 21 formed on the outer circumferential surface of the guide ring 2, and thereby hold the guide ring 2 on the inner circumferential surface of the frame 30.

The metal wire material constituting the frame 30 is made from a titanium alloy, stainless steel, or an aluminum alloy, for example. Specifically, titanium alloy is preferable from the standpoint of weight reduction. The metal wire material has a rectangular cross section. In the present embodiment, the frame 30 is solid.

From the standpoint of realizing both weight reduction and improved strength, and to easily secure a contact area with the guide ring 2, a hollow, linear tubular material is preferable as the metal wire material of the frame 30, which can have a cavity without a filler. The wire diameter (outer diameter) of the metal wire material to be employed can be approximately 0.3 to 6 mm, for example.

As shown in FIG. 4, the frame 30 has an inner circumferential portion that is accommodated in the outer circumferential groove 21 of the guide ring 2, and is integrally connected to the guide ring 2 by an adhesive 4 that fills a space S that is formed with the outer circumferential groove 21. The frame 30 is formed in an essentially rectangular shape that is long in the front-rear direction X, and includes an inner circumferential surface 30*a*, an outer circumferential surface 30*b*, a front surface 30*c*, and a rear surface 30*d*. Further, the frame 30 has approximately the same cross-sectional shape over its entire length. That is, the inner circumferential surface 30*a* is disposed over the entire semi-circumferential portion (the range of L shown in FIGS. 1 and 2) on the side away from the rod body 10, but can be disposed in any part of the semi-circumferential portion.

The inner circumferential surface 30*a* of the frame 30 (second opposing surface) opposes the curved concave surface 21A formed on this outer circumferential groove 21 in a state of entering inside the outer circumferential groove 21 of the guide ring 2. The inner circumferential surface 30*a* of the frame 30 has a planar shaped portion 301 along the direction of central axis 2C (see FIG. 2) of the guide ring 2. Tapered surfaces 302 are formed on both sides (front side X1, rear side X2) of the planar shaped portion 301 in the front-rear direction X, respectively connected to the front surface 30*c* and the rear surface 30*d*. Portions of the two tapered surfaces 302 (corners 302*a*, 302*b* of the tapered surfaces 302) of the frame 30 are in contact with the curved concave surface 21A of the outer circumferential groove 21.

In this manner, the inner circumferential surface 30*a* of the frame 30 and the curved concave surface 21A of the outer circumferential groove 21 have different shapes. That is, in the guide for a fishing rod 1, the space S is formed between the curved concave surface 21A of the curved guide ring 2, and the inner circumferential surface 30*a* of the frame 30 formed from three planes (the planar shaped portion 301 and the pair of tapered surfaces 302, 302). This space S is filled with the adhesive 4. The guide ring 2 is fixed to the frame 30 by the adhesive 4.

As for the assembly method for fixing the guide ring 2 to the frame 30, the adhesive 4 is applied to or filled into the curved concave surface 21A of the outer circumferential groove 21 of the guide ring 2. The outer circumferential groove 21 is then engaged with the inner circumferential surface 30*a* of the frame 30. Here, the tapered surfaces 302 of the inner circumferential surface 30*a* are positioned in a location where the curved concave surface 21A are abutted, and by curing the adhesive 4, the outer circumferential groove 21 is fixed to the inner circumferential surface 30*a* of the frame 30 and assembled.

The operation of the guide for a fishing rod 1 configured in this manner will now be described in detail with reference to the drawings.

As shown in FIG. 4, in the present embodiment, since the curved concave surface 21A of the outer circumferential groove 21 of the guide ring 2 that opposes at least a portion of the frame 30, and the inner circumferential surface 30*a* of the flat surface-shaped frame 30 that opposes the curved concave surface 21A have different shapes, it is possible to increase the opposing surface areas of the curved concave surface 21A and the inner circumferential surface 30*a*. It is thus possible to secure a large contact area between the guide ring 2 and the frame 30, thereby enhancing the attachment force of both.

Further, in the present embodiment, since it is sufficient to arrange the curved concave surface 21A of the guide ring 2 and the inner circumferential surface 30*a* of the frame 30 so as to be mutually opposing, the positioning of the frame 30 and the guide ring 2 is simplified.

Moreover, in the present embodiment, since it is not necessary to match the cross-sectional shape of the frame 30 to the shape of the outer circumferential groove 21 of the guide ring 2, it is possible to reduce the thickness and the cross-sectional shape of the frame 30, thereby reducing the weight.

Further, by the present embodiment, the ring contact portion of the frame 30 is fixed when accommodated in the outer circumferential groove 21 of the guide ring 2, so that it is possible to minimize the overhanging portion of the frame 30 that protrudes from the outer circumferential groove 21. As a result, it is possible to prevent breakage of the frame at the part that protrudes from the outer circumferential groove, tangling of the fishing line in the overhanging portion, and pooling of salt water due to the presence of adhering seawater, as has been determined to occur in the prior art.

Further, in the present embodiment, the curved concave surface 21A of the guide ring 2 has a concave shape recessed toward the center of the guide ring 2, and the inner circumferential surface 30*a* of the frame 30 is configured to have a planar shaped portion along the central axis direction of the guide ring 2. As a result, a large space (area) can be obtained between the guide ring 2 and the frame 30, the space (area) filled with sufficient adhesive 4, as in the present embodiment, and the attachment strength between the inner circumferential surface 30a and the outer circumferential groove 21 increased, thereby enhancing the fixing force of both.

Further, in the present embodiment, it is possible to obtained a sufficient space S (filling area) between the outer circumferential groove 21 and the inner circumferential surface 30a of the frame 30. By filling this filling area with the adhesive 4, the fixing force between the inner circumferential surface 30a and the outer circumferential groove 21 can be further enhanced.

Moreover, by filling the space S between the frame 30 and the guide ring 2 with the adhesive 4, it is possible to eliminate a gap (step) formed between the frame 30 and the guide ring 2, so that seawater does not remain in the stepped portion, as has occurred in the prior art, making it possible to suppress or avoid the occurrence of the pooling of saltwater.

Further, in the present embodiment, because the curved concave surface 21A and/or the inner circumferential surface 30a is disposed in at least a portion of the semi-circumferential portion on the side away from the rod body 10, the connection area between the frame 30 and the guide ring 2 can be a non-continuous or partial connection in the circumferential direction, so that the cross-sectional area of the member can be reduced compared with connecting over the entire circumference, thereby achieving a reduction in weight.

Further, in the present embodiment, the width of the rectangular portion of the frame 30 can be configured to correspond to the groove width, so that the thickness of the wire material of the frame 30 can be thinner than in the prior art, and to reduce the overall weight of the guide for a fishing rod 1.

As described above, by the guide for a fishing rod 1 according to the present embodiment which has been configured in the manner described above, positioning between the frame 30 and the guide ring 2 is a simple matter, decreased fixing force of both of these members can be prevented, and a reduction in weight can be achieved.

First Modified Example

Figure 5:
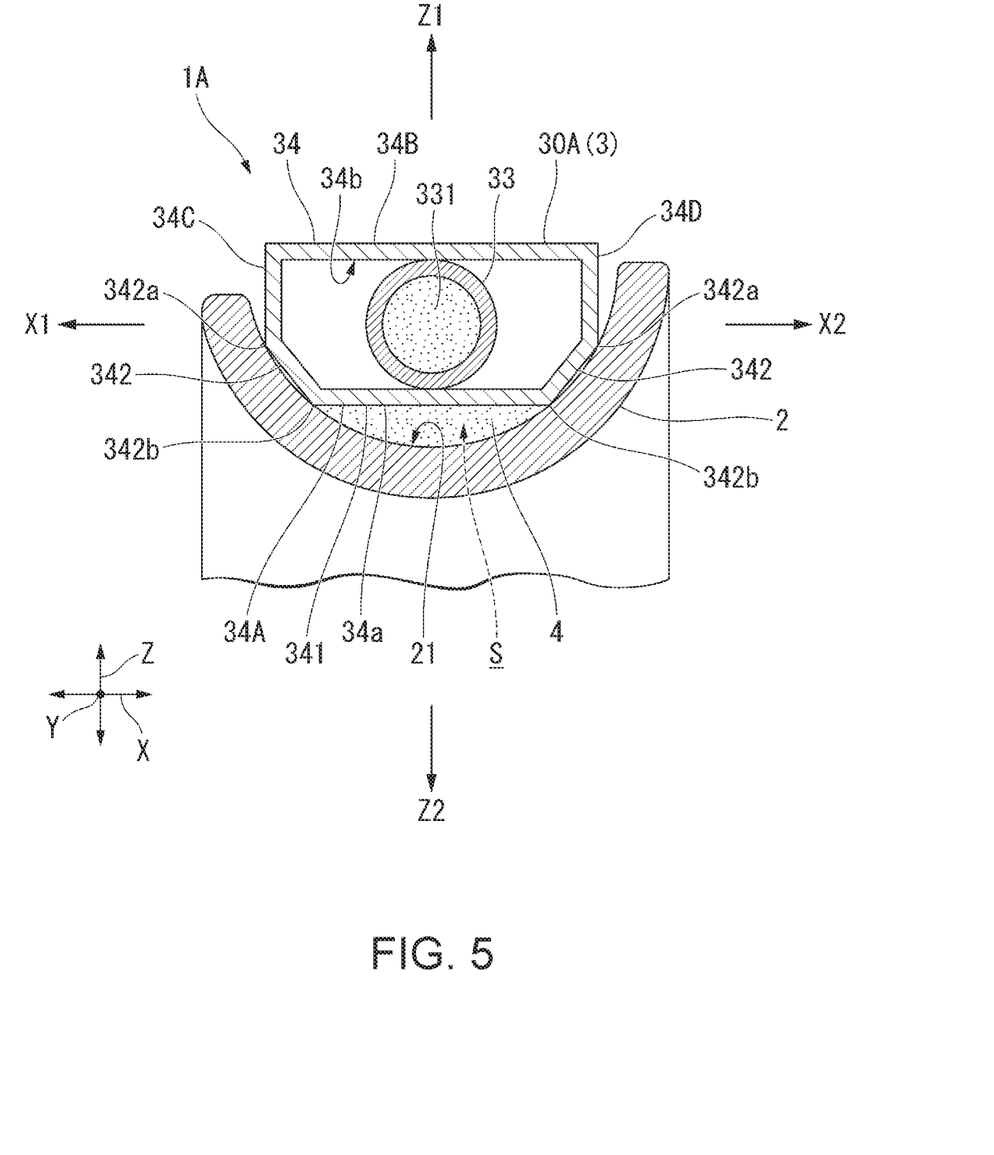
FIG. 5 is a cross-sectional view showing the fixed state of the frame and the guide ring in the guide for a fishing rod according to a first modified example.

A guide for a fishing rod 1A according to a first modified example as shown in FIG. 5 is configured such that a frame 30A has a wire material 33 with a circular cross section and a sleeve 34 that houses a portion of the wire material 33. In this first modified example, a solid metal wire material configured by filling a hollow tubular material with a filler 331, such as resin, is employed as the wire material 33, but a hollow tubular material without the filler 331 can be used as well. The guide ring 2 according to the first modified example is configured to have the outer circumferential groove 21 in which is formed the same curved concave surface 21A as in the embodiment described above.

The sleeve 34 is formed in an essentially rectangular shape having a hollow through-hole 34b (housing portion) that is long in the front-rear direction X as seen in cross section. The wire material 33 is inserted and accommodated in the inner side of the through-hole 34b. That is, the sleeve 34 extends along the wire material 33 in a U shape. The sleeve 34 has an inner circumferential portion that is disposed in the outer circumferential groove 21 of the guide ring 2 and is integrally connected to the guide ring 2 via the adhesive 4 that fills the space S that is formed between the sleeve 34 and the outer circumferential groove 21.

In this first modified example, the sleeve 34 has the through-hole 34b, but it is not limited to having the through-hole 34b, and, for example, a groove that can engage with the wire material 33 can be provided instead.

Further, in the present first modified example, the inside of the through-hole 34b of the sleeve 34 is hollow, but this hollow portion can be filled with a lightweight material, such as a foaming agent, to thereby hold the wire material 33 inside the through-hole 34b.

The sleeve 34 has an inner circumferential wall 34A, an outer circumferential wall 34B, a front wall 34C, and a rear wall 34D. Further, the sleeve 34 has approximately the same cross-sectional shape over its entire length. That is, the inner circumferential wall 34A is disposed over the entire semi-circumferential portion (the range of L shown in FIGS. 1 and 2) on the side away from the rod body 10, but can be disposed in any part of the semi-circumferential portion.

The inner circumferential surface 34a of the inner circumferential wall 34A in the sleeve 34 opposes the curved concave surface 21A formed on this outer circumferential groove 21 when entering within the outer circumferential groove 21 of the guide ring 2. The inner circumferential surface 34a of the inner circumferential wall 34A has a planar shaped portion 341 along the direction of central axis 2C of the guide ring 2 as seen in cross section. Tapered surfaces 342 are formed on both sides (front side X1, rear side X2) of the planar shaped portion 341 in the front-rear direction X, respectively connected to the front wall 34C and the rear wall 34D. Portions of the two tapered surfaces 342 (corners 342a, 342b of the tapered surfaces 342) of the sleeve 34 are in contact with the curved concave surface 21A of the outer circumferential groove 21.

In this manner, the inner circumferential surface 34a of the sleeve 34 and the curved concave surface 21A of the outer circumferential groove 21 have different shapes. That is, in the guide for a fishing rod 1A according to the first modified example, the space S is formed between the curved concave surface 21A of the curved guide ring 2 and the inner circumferential surface 34a formed from three planes (the planar shaped portion 341 and the pair of tapered surfaces 342, 342) of the sleeve 34. This space S is filled with the adhesive 4. The guide ring 2 is held in a state of being fixed to the wire material 33 via the sleeve 34 by the adhesive 4.

In the first modified example described above, the rectangular sleeve 34, which is a different member than the wire material of the frame 30A, can cover the wire material, and the rectangular sleeve 34 is housed and fixed in the outer circumferential groove 21 of the guide ring 2.

In this embodiment, since the sleeve 34 has a rectangular cross-sectional shape, for example, it is possible to increase the surface area of the portion of the sleeve 34 housed in the outer circumferential groove 21 and to obtain a large contact area between the sleeve 34 and the outer circumferential groove 21. As a result, a large filling area can be obtained where the adhesive 4 can be filled between the outer circumferential groove 21 and the sleeve 34, thus making it possible to increase the adhesive force between the sleeve 34 and the outer circumferential groove 21 and to enhance the fixing force of both.

Further, by making the sleeve 34 and the wire material separate members, a thin wire material can be applied. Further, in the present first modified example, a material different from that of the wire material can be employed for the sleeve 34, so that by using, for example, a material with good adhesion, the fixing force with the guide ring 2 can be enhanced.

Further, in the present first modified example, since at least a portion of the sleeve 34 is formed to have a rectangular cross section, it is not necessary to form the inner circumferential surface 30a using a separate member. As a result, the frame 30 can be easily processed, thereby suppressing or avoiding an increase in the cost of the member.

Further, in the present modified example, the sleeve 34 has the through-hole 34b that houses the wire material of the frame 30A, so that the contact area between the sleeve 34 and the wire material housed in the through-hole 34b can be increased.

Second Modified Example

Figure 6:
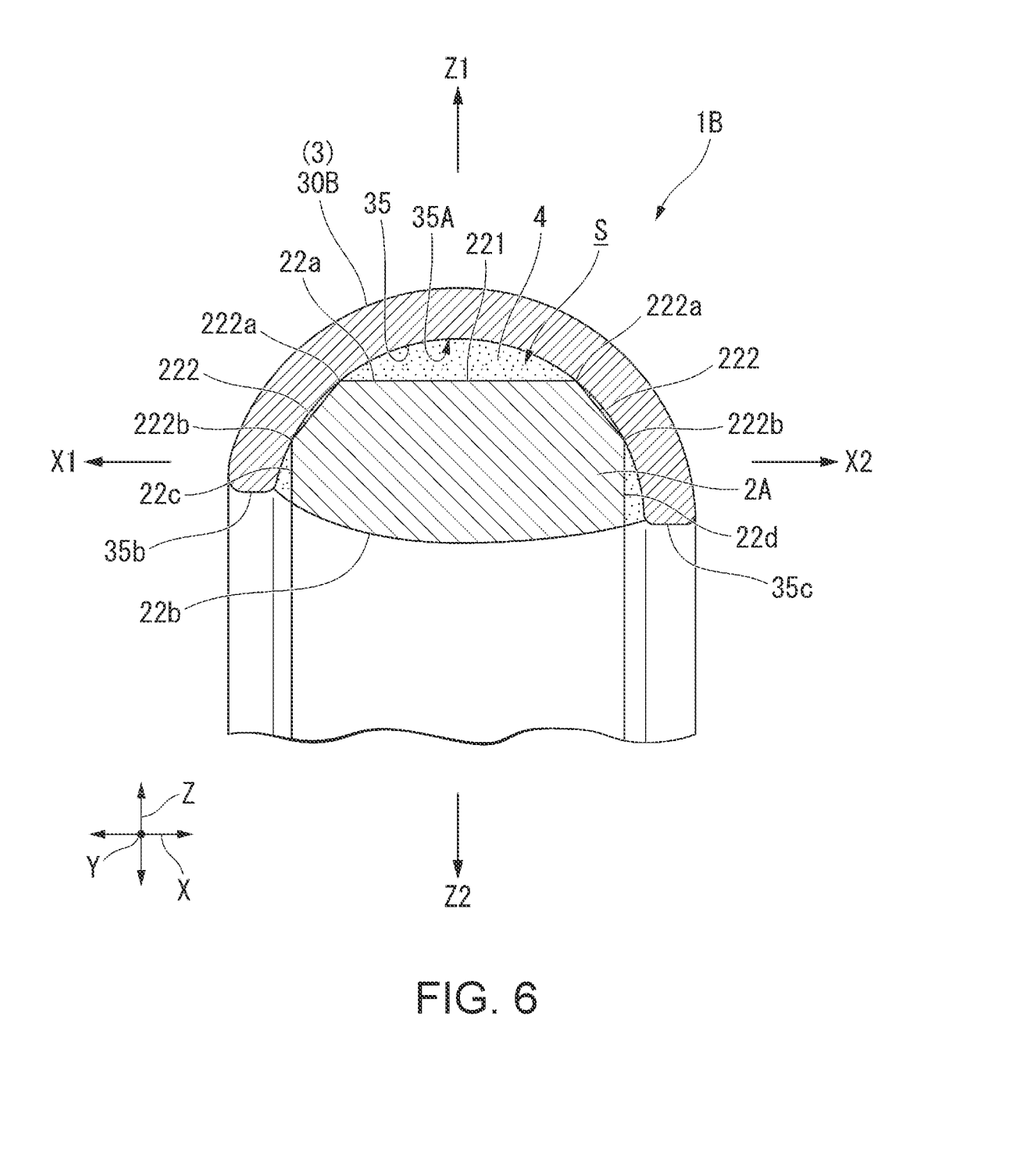
FIG. 6 is a cross-sectional view showing the fixed state of the frame and the guide ring in the guide for a fishing rod according to a second modified example.

A guide for a fishing rod 1B according to a second modified example as shown in FIG. 6 is configured such that a planar shaped portion 221 is formed in the outer circumferential portion of a guide ring 2A, and an inner peripheral groove 35 (concave portion) is disposed in the inner circumferential portion of a frame 30B. A part (planar shaped portion 221) of the outer circumferential portion of the guide ring 2A engages the inner side of the inner circumferential groove 35 of the frame 30B, thereby fixing the guide ring 2A to the frame 30B.

The inner peripheral groove 35 of the frame 30B according to the second modified example has a curved surface that is curved in the front-rear direction X so as to have a convex shape on the outer side (direction away from the central axis 2C) in the radial direction as seen in cross section. The inner peripheral groove 35 has a curved concave surface 35A (second opposing surface) that opposes at least a portion of the guide ring 2A. The curved concave surface 35A has a concave portion that is recessed toward the opposing side (opposite direction) of the center direction (central axis 2C side) of the guide ring 2A in the radial direction.

Specifically, the inner peripheral groove 35 of the frame 30B has flange portions 35b, 35c, in which both sides of a bottom portion 35a of the central portion in the front-rear direction X respectively protrude radially outward as seen in cross section. As a result, the concave inner peripheral groove 35 is formed over the entire length of the frame 30B on the inner circumferential surface of the frame 30B, between the two flange portions 35b, 35c.

The guide ring 2A is formed with an essentially solid rectangular shape that is long in the front-rear direction X as seen in cross section. The guide ring 2A has an outer circumferential portion that is disposed in the inner peripheral groove 35 of the frame 30B, and is integrally connected to the guide ring 2A by the adhesive 4 which fills the gap S that is formed between the guide ring 2A and the inner peripheral groove 35.

The guide ring 2A has an outer circumferential surface 22a, an inner circumferential surface 22b, a front surface 22c, and a rear surface 22d. Further, the inner circumferential surface 22b of the guide ring 2A is curved in an arc shape. The outer circumferential surface 22a of the guide ring 2A (first opposing surface) opposes the curved concave surface 35A formed on this inner peripheral groove 35 in a state of entering within the inner circumferential groove 35 of the frame 30B. The outer circumferential surface 22a has a planar shaped portion 221 along the direction of central axis 2C of the guide ring 2A as seen in cross section. Tapered surfaces 222 are formed on both sides (front side X1, rear side X2) of the planar shaped portion 221 in the front-rear direction X, respectively connected to the front surface 22c and the rear surface 22d. Portions of the two tapered surfaces 222 (corners 222a, 222b of the tapered surfaces 222) of the guide ring 2A are in contact with the curved concave surface 35A of the inner peripheral groove 35. In the second modified example, the space between the inner peripheral groove 35 (curved concave surface 35A) of the frame 30B and the front surface 22c and the rear surface 22d is also filled with the adhesive 4.

As described above, in the guide for a fishing rod 1B according to the second modified example, the outer circumferential surface 22a of the guide ring 2A and the curved concave surface 35A of the inner peripheral groove 35 have different shapes. That is, in the guide for a fishing rod 1B according to the second modified example, the space S is formed between the curved concave surface 35A of the curved frame 30B and the outer circumferential surface 22a formed from three planes (the planar shaped portion 221 and the pair of tapered surfaces 222, 222) of the guide ring 2A. This space S is filled with the adhesive 4. The guide ring 2A is fixed to the frame 30B by the adhesive 4.

In the present second modified example described above, since the outer circumferential surface 22a of the outer circumferential groove 21 of the guide ring 2 that opposes at least a portion of the frame 30B, and the curved concave surface 35A of the frame 30B that opposes this outer circumferential surface 22a have different shapes, it is possible to increase the opposing surface areas of the outer circumferential surface 22a and the curved concave surface 35A. It is thereby possible to secure a large contact area between the guide ring 2 and the frame 30B, and thus to improve the fixing force of both.

Further, in the present embodiment, since it is sufficient to arrange the outer circumferential surface 22a of the guide ring 2 and the second opposing surface of the frame 30B so as to face each other, the positioning of the frame 30B and the guide ring 2 becomes a simple matter.

Moreover, in the present embodiment, since it is not necessary to match the cross-sectional shape of the frame 30B to the shape of the outer circumferential groove 21 of the guide ring 2, it is possible to reduce the thickness and the size of the cross-sectional area of the frame 30B, and thus reduce the weight.

Further, in the second modified example, since the outer circumferential surface 22a has a planar shape along the central axis direction of the guide ring 2 and the curved concave surface 35A has a concave portion recessed toward the direction opposite to the center direction of the guide ring 2, the large space S (area) between the guide ring 2 and the frame 30B can be obtained, which makes it possible to fill the space (area) with sufficiently adhesive 4, as in the present embodiment, and to enhance the fixing force between the curved concave surface 35A and the outer circumferential groove 21.

Although embodiments of the guide for a fishing rod according to the present invention have been described, these embodiments have been presented only as examples and are not intended to limit the scope of the invention. The embodiments can be implemented in a variety of other forms; furthermore, various omissions, substitutions and changes can be made without departing from the essence of the invention. Embodiments and modifications thereof include those that can be easily conceived of by a person skilled in the art, those that are substantially the same, and those that are of equivalent scope.

For example, in the present embodiment, the first opposing surface and/or the second opposing surface is provided on at least a part of a semi-circumferential portion on a side away from the rod body 10, but it can be provided on the entire semi-circumferential portion as in the above-described embodiment, or be non-continuous in the circumferential direction.

In the present embodiment, an example is shown in which the adhesive 4 is used to fix the guide ring 2 and the frames 30, 30A, 30B, but it is not limited to the adhesive 4, and the fixing method can be by swaging.

In the present embodiment, the direction away from the rod body 10 in the vertical direction from the protruding distal end side of the guide for a fishing rod is defined as the upper side, but this is a case in which the guide for a fishing rod is disposed on the upper side of the rod body for a dual bearing reel; however, in the case of a rod body for a spinning reel, the guide for a fishing rod is attached on the lower side of the rod body 10, so that, in this case, in the protruding distal end side of the guide for a fishing rod, the direction away from the rod body is the upper side.

In the present embodiment, a metal wire material is employed as the frame, but the frame can be made of sheet metal.

Further, in the present embodiment, the supporting leg portion 31 and the mounting leg portion 32 have a two-legged configuration, but they can have a one-legged configuration.

What is claimed is:

1. A guide for a fishing rod, comprising:
   a guide ring configured to have a fishing line inserted therethrough; and
   a guide frame configured to be fixed to a rod body, extending outward in a radial direction of the rod when the guide frame is fixed to the rod body, and holding the guide ring,
   the guide ring having an outer circumferential groove along an outer circumferential edge positioned on an outer side of a central axis of the guide ring in the radial direction of the rod, the groove having a width,
   the guide frame further having
   a frame comprising a ring-shaped wire material holding the guide ring, the frame having an entirely monolithic configuration and a width, the width of the frame being less than the width of the groove such that the frame is disposed within the outer circumferential groove of the guide ring, and front and rear opposing surfaces of the guide frame being at least partially disposed within the circumferential groove,
   a supporting leg portion configured to be fixed to the rod body and connecting to and supporting the frame, and
   a first opposing surface of the outer circumferential groove opposing at least a portion of the frame, and a second opposing surface of the at least a portion of the frame opposing the first opposing surface, the first opposing surface having a first shape and the second opposing surface having a second shape, the first shape being different from the second shape,
   the first shape of the first opposing surface including a concave portion recessed toward a center of the guide ring, and the second shape of the second opposing surface including a planar shape along a direction of the central axis of the guide ring, and
   a space disposed between the first opposing surface and the second opposing surface, and the space is filled with an adhesive.

2. The guide for a fishing rod according to claim 1, wherein the second opposing surface is disposed on a side away from the rod body.

3. The guide for a fishing rod according to claim 1, wherein
   a sleeve is disposed on a portion of the wire material of the frame, and
   the second opposing surface is disposed in the sleeve.

4. The guide for a fishing rod according to claim 3, wherein at least part of the sleeve has a rectangular cross-sectional shape.

5. The guide for a fishing rod according to claim 3, wherein the sleeve has a housing portion to accommodate the wire material of the frame.

\* \* \* \* \*